US012534038B2

United States Patent
Lin et al.

(10) Patent No.: US 12,534,038 B2
(45) Date of Patent: Jan. 27, 2026

(54) ROOF-MOUNTED OCCUPANT RESTRAINT SYSTEM

(71) Applicant: GM Global Technology Operations LLC, Detroit, MI (US)

(72) Inventors: Chin-hsu Lin, Troy, MI (US); Chang Kyu Son, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/666,552

(22) Filed: May 16, 2024

(65) Prior Publication Data

US 2025/0353459 A1 Nov. 20, 2025

(51) Int. Cl.
*B60R 21/231* (2011.01)
*B60R 21/21* (2011.01)
(Continued)

(52) U.S. Cl.
CPC .......... *B60R 21/231* (2013.01); *B60R 21/214* (2013.01); *B60R 21/233* (2013.01); *B60R 21/235* (2013.01); *B60R 2021/23153* (2013.01); *B60R 2021/23192* (2013.01); *B60R 2021/23308* (2013.01); *B60R 2021/23324* (2013.01);
(Continued)

(58) Field of Classification Search
CPC ... B60R 21/231; B60R 21/214; B60R 21/232; B60R 21/2338; B60R 21/213; B60R 21/233; B60R 21/235; B60R 21/23184; B60R 2021/23192; B60R 2021/23153; B60R 2021/23382; B60R 2021/23308; B60R 2021/23324; B60R 2021/2612; B60R 2021/26058; B60R 2021/23504; B60R 2021/23514; B60R 2021/23509;
(Continued)

(56) References Cited

U.S. PATENT DOCUMENTS

| 6,722,691 B1 * | 4/2004 | H.ang.land | B60R 21/233 |
| | | | 280/743.2 |
| 2004/0183282 A1 * | 9/2004 | Schneider | B60R 21/232 |
| | | | 280/732 |

(Continued)

FOREIGN PATENT DOCUMENTS

| DE | 19860827 A1 * | 7/2000 | | B60R 21/232 |
| DE | 102020107134 A1 * | 9/2021 | | |

(Continued)

*Primary Examiner* — Keith J Frisby
(74) *Attorney, Agent, or Firm* — Honigman LLP; Matthew H. Szalach; Jonathan P. O'Brien

(57) ABSTRACT

A restraint system of a vehicle having a roof and a cabin with a seat for an occupant includes an inflator mounted to the roof of the vehicle and an airbag communicatively coupled to the inflator and inflatable to a deployed position from a stored position. The airbag comprising a main body comprising a first side that faces an upper half of an occupant, a second side that faces a lower half of the occupant, a first end coupled to the first and second sides, and a second end coupled to the first and second sides. The airbag further comprising a first tube communicatively coupled to the inflator and the main body between the first end and the second end and a second tube communicatively coupled to the inflator and the main body between the first end and the second end.

15 Claims, 4 Drawing Sheets

(51) Int. Cl.
  *B60R 21/214* (2011.01)
  *B60R 21/233* (2006.01)
  *B60R 21/2338* (2011.01)
  *B60R 21/235* (2006.01)
  *B60R 21/26* (2011.01)
(52) U.S. Cl.
  CPC .............. *B60R 2021/23382* (2013.01); *B60R 2021/23504* (2013.01); *B60R 2021/23509* (2013.01); *B60R 2021/23514* (2013.01); *B60R 2021/23519* (2013.01); *B60R 2021/26058* (2013.01); *B60R 2021/26094* (2013.01)
(58) Field of Classification Search
  CPC ........... B60R 2021/23519; B60R 2021/23523; B60R 2021/26094
  USPC .................. 280/729, 730.1, 743.1, 743.2
  See application file for complete search history.

(56) References Cited

U.S. PATENT DOCUMENTS

| | | | |
|---|---|---|---|
| 2005/0023806 A1* | 2/2005 | Higuchi | B60R 21/2338 280/753 |
| 2018/0222432 A1 | 8/2018 | Schneider | |
| 2018/0272985 A1* | 9/2018 | Nagasawa | B60R 21/232 |
| 2019/0054888 A1* | 2/2019 | Fukawatase | B60R 21/231 |
| 2019/0299908 A1* | 10/2019 | Farooq | B60R 21/233 |
| 2021/0155194 A1* | 5/2021 | Goswami | B60R 21/207 |
| 2021/0179005 A1* | 6/2021 | Jayakar | B60R 21/01 |
| 2021/0179006 A1* | 6/2021 | Hellot | B60R 21/233 |

FOREIGN PATENT DOCUMENTS

| | | | |
|---|---|---|---|
| JP | 2013112300 A | * | 6/2013 |
| JP | 2019130944 A | * | 8/2019 |

\* cited by examiner

ROOF-MOUNTED OCCUPANT RESTRAINT SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to vehicle airbags and, more particularly, to a roof-mounted airbag.

In general, vehicles can be equipped with safety systems such as airbags. However, existing systems commonly rely on a portion of an interior of the vehicle as a reaction surface. Some interior arrangements of vehicles do not provide a reaction surface and, thus, ordinary airbag systems will not suffice. One or more shortcomings of existing systems will be addressed by one or more aspects of the present disclosure.

SUMMARY

According to one configuration, a restraint system of a vehicle having a roof and a cabin with a seat for an occupant is provided and includes an inflator mounted to the roof of the vehicle. The restraint system further includes an airbag communicatively coupled to the inflator and inflatable to a deployed position from a stored position. The airbag includes a main body including a first side that faces an upper half of an occupant, a second side that faces a lower half of the occupant, a first end coupled to the first and second sides, and a second end coupled to the first and second sides. The airbag further includes a first tube communicatively coupled to the inflator and the main body between the first end and the second end and a second tube communicatively coupled to the inflator and the main body between the first end and the second end.

The restraint system may include one or more of the following optional aspects. For example, the inflator can include a first inflator coupled to the first tube and a second inflator coupled to the second tube.

According to at least one aspect, the main body can further include a tether located toward the first end that is coupled to the first side and the second side.

According to another aspect, the airbag extends with respect to a vertical axis and the second side contacts a lap area of the occupant, wherein the lap area is a reaction surface for the airbag.

According to at least one example, the first tube and the second tube are made of a first material and the main body is made of a second material. The first material can be a different material than the second material. The first material can be a stronger material than the second material.

According to another example, the first tube and the second tube each includes a curved shaped.

According to at least one aspect, the first tube and the second tube each forms an acute angle with respect to a vertical axis.

According to another aspect, the first tube and the second tube each includes a one-way flow valve arranged upstream from the main body.

According to at least one example, the main body includes one or more one-way flow valves arranged downstream of the first tube and the second tube.

According to another example, the first tube and the second tube each includes a circular cross-sectional shape.

According to at least one aspect, the first tube and the second each includes a non-circular cross-sectional shape.

According to another configuration, a vehicle is provided and includes an interior including a floor and a roof spaced from the floor and one or more seats coupled to the floor and arranged for one or more occupants. The vehicle further includes a restraint system arranged with respect to each of the one or more seats. The restraint system includes an inflator mounted to the roof and an airbag communicatively coupled to the inflator and inflatable to a deployed position from a stored position. The airbag includes a main body, a first tube communicatively coupled to the inflator and the main body, and a second tube communicatively coupled to the inflator and the main body. The airbag is configured to cradle an upper half of one of the one or more occupants situated in one of the seats.

The vehicle may include one or more of the following optional aspects. For example, a lower half of one of the one or more occupants can be a reaction surface for the airbag.

According to at least one aspect, the first tube and the second tube can be made of a first material and the main body can be made of a second material. The first material can be a different material than the second material. The first material can be a stronger material than the second material.

According to at least one example, the first tube and the second tube each includes a one-way flow valve arranged upstream from the main body.

According to another example, the main body includes one or more one-way flow valves arranged downstream of the first tube and the second tube.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
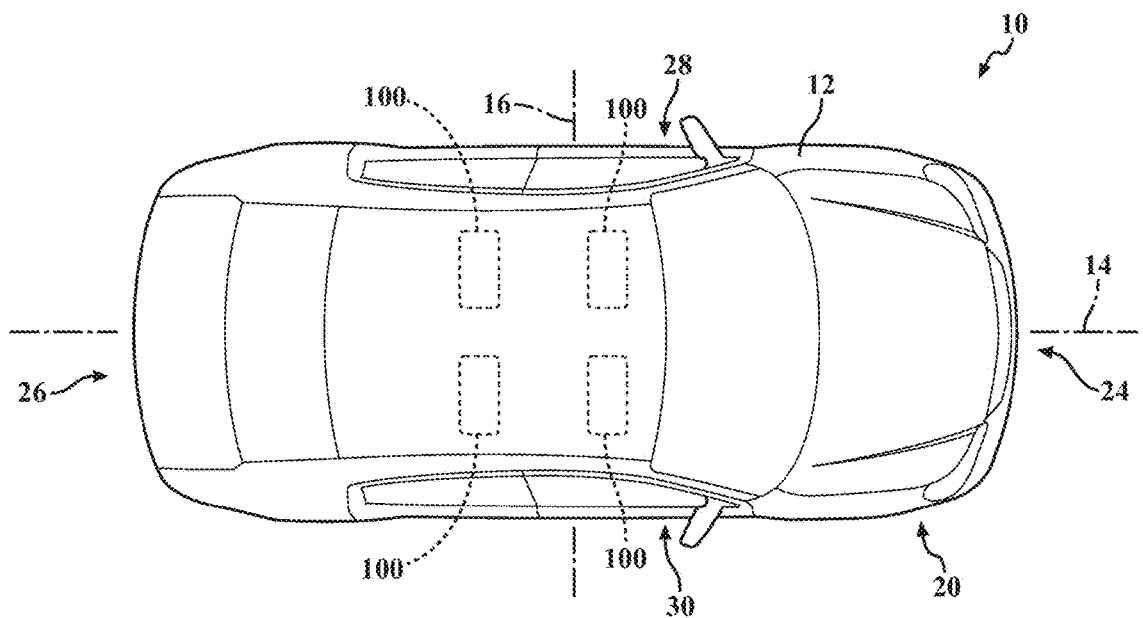
FIG. 1 is a top view of a vehicle according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
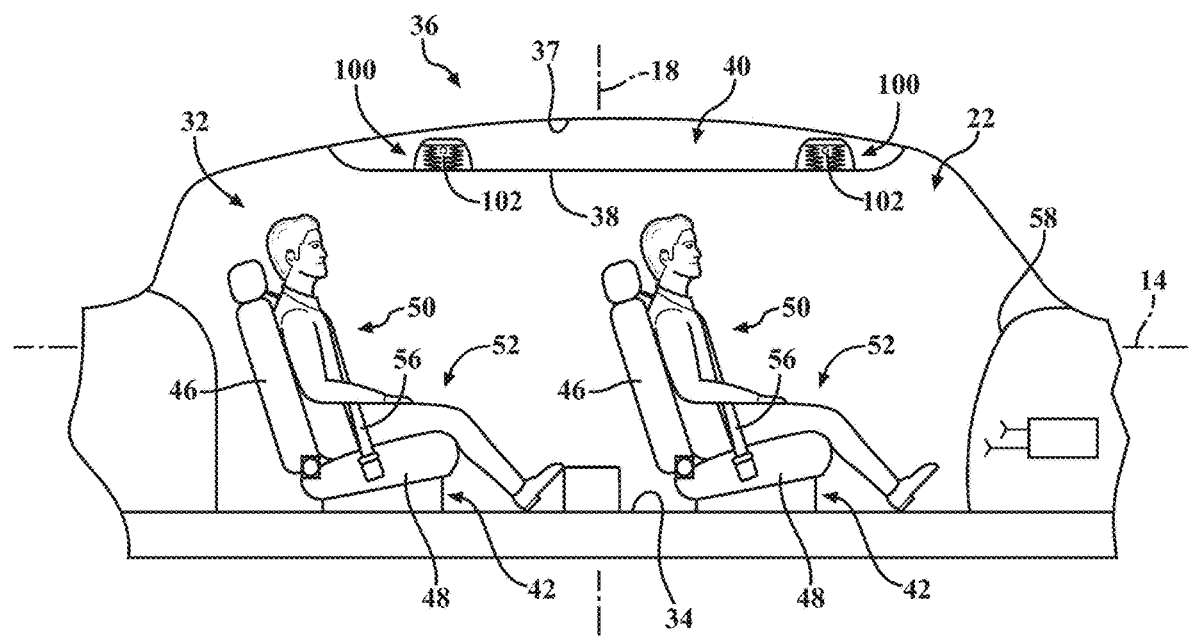
FIG. 2 is a schematic illustration of an interior of the vehicle of FIG. 1 with a first seating configuration and an example of a roof-mounted restraint system.

With reference to FIG. 1, a vehicle 10 is provided and includes a vehicle body 12 extending along a first axis 14 in a fore-aft direction, along a second axis 16 in a cross-car direction, and along a third axis 18 (FIG. 2) in a vertical direction. The vehicle 10 includes an exterior 20 and an interior 22. The exterior 20 includes a first or front end 24, a second or rear end 26 opposite the first end 24, a first or driver side 28, and a second or passenger side 30 opposite the first side 28. The interior 22 defines a cabin 32 and includes a floor 34 spaced from a roof 36, as shown in FIG. 2. The roof 36 can include an exterior roof panel 37 and an interior roof panel 38. A chamber 40 exists between the exterior roof panel 37 and the interior roof panel 38 that can include a pathway for HVAC ductwork and electrical wiring, for example. The interior 22 can further include one or more seats 42 coupled to the floor 34. Traditionally, the vehicle 10 includes two or more seats 42 facing the front end 24 of the vehicle 10, as shown in FIG. 2. In one configuration, as shown in FIGS. 3-6, the vehicle 10 can include seats 42 that face the front end 24 of the vehicle 10 and seats 42 that face the rear end 26 of the vehicle 10. In another configuration, the vehicle 10 can include seats 42 that face the first side 28 of the vehicle 10 and seats 42 that face the second side 30 of the vehicle 10.

Each seat 42 is configured to support an occupant 44 and can include a first or upper portion 46 and a second or lower portion 48. The upper portion 46 can be configured to support an upper half (e.g., head, neck, torso, etc.) 50 of the occupant 44 and the lower portion 48 can be configured to support a lower half (e.g., legs) 52 of the occupant 44. In other words, the occupants 44 may be situated in the seats 42 so that a lap area 54 (i.e., an anterior side of the lower half 52) is facing the roof 36 or the interior roof panel 38. Each seat 42 can also include a seat belt 56 for securing the occupant 44 to the seat 42.

Figure 3:
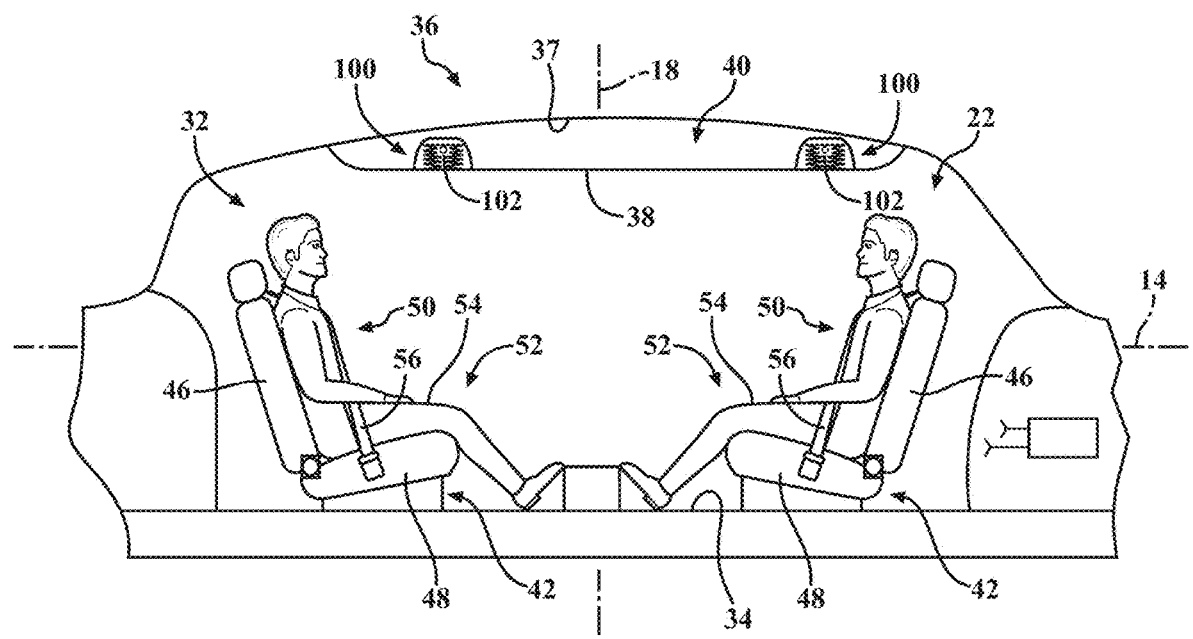
FIG. 3 is a schematic illustration of an interior of the vehicle of FIG. 1 with a second seating configuration and another example of a roof-mounted restraint system.

With reference to FIGS. 2 and 3, the seats 42 may be arranged remotely from an instrument panel 58 (FIG. 2) or, as shown in FIG. 3, the vehicle 10 may not have an instrument panel that is accessible by the occupants 44. In general, either arrangement may be desirable to increase the amount of space within the cabin 32 to enhance the driving experience for the occupants 44. As a result, however, traditional restraint systems (i.e., airbags arranged in the instrument panel) are not applicable.

According to at least one aspect of the present disclosure, the vehicle 10 includes a roof-mounted occupant restraint system (i.e., restraint system) 100 that can be arranged with respect to one of the one or more seats 42. The restraint system 100 includes an inflator 102 and an airbag 104 communicatively coupled to the inflator 102. With reference to FIGS. 2 and 3, the inflator 102 can be coupled to the roof 36 and, more particularly, can be arranged in the chamber 40 between the exterior roof panel 37 and the interior roof panel 38. While not readily shown in the figures, the inflator 102 can comprise more than one inflator such as, a first inflator and a second inflator. In other words, the airbag 104 can be inflated with a single inflator or more than one inflator.

Figure 4:
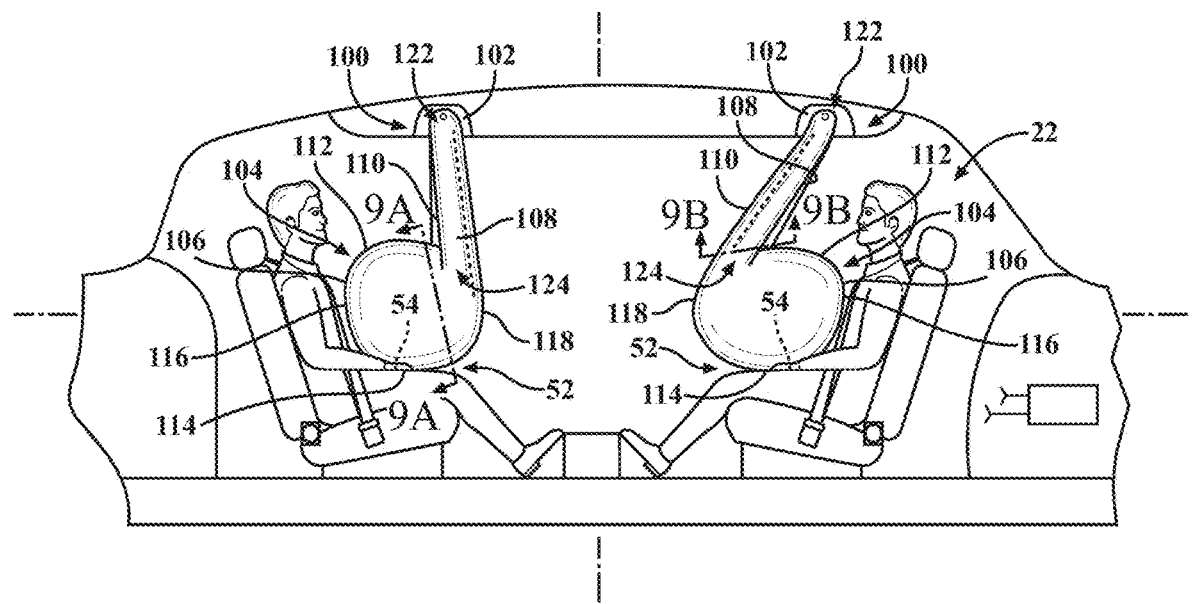
FIG. 4 is a schematic illustration of the vehicle of FIG. 1 with airbags in a deployed position.

With reference to FIG. 4, the airbag 104 includes a main body 106, a first arm or tube 108, and a second arm or tube 110. As shown, the first arm or tube 108 and the second arm or tube 110 are coupled to and extend between the main body 106 and the inflator 102. The main body 106 can have a first side 112 that faces the upper half 50 of the occupant 44 with respect to the third axis 18 and a second side 114 that faces the lower half 52 of the occupant 44 with respect to the third axis 18. Additionally, the main body 106 can have a first end 116 that is coupled to the first side 112 and the second side 114 and faces the occupant 44. The main body 106 can also have a second end 118 that is coupled to the first side 112 and the second side 114 and faces away from the occupant 44. While not readily shown, the main body 106 can include one or more vent holes that allow the main body 106 to deflate at a specified flow rate after being deployed. The vent holes may be desirable so that the main body 106 can absorb energy when contacted by the occupant 44, for example.

According to at least one aspect, the main body 106 can be shaped and/or contoured so that the airbag 104 can better receive the upper half 50 of the occupant 44 when the airbag 104 is deployed. For instance, with reference to FIGS. 6 and 7, a tether or strap 120 may be coupled to the first side 112 and the second side 114 so that airbag 104 is tapered from the second end 118 to the first end 116 and/or contoured on the first side 112. The main body 106 may be made of a first material such as a woven fabric (e.g., nylon 6, nylon 66, and nylon 46) that is impermeable to gases (e.g., nitrogen, argon, etc.) and flame resistant. Additionally, the first material can be coated or uncoated.

Figure 6:
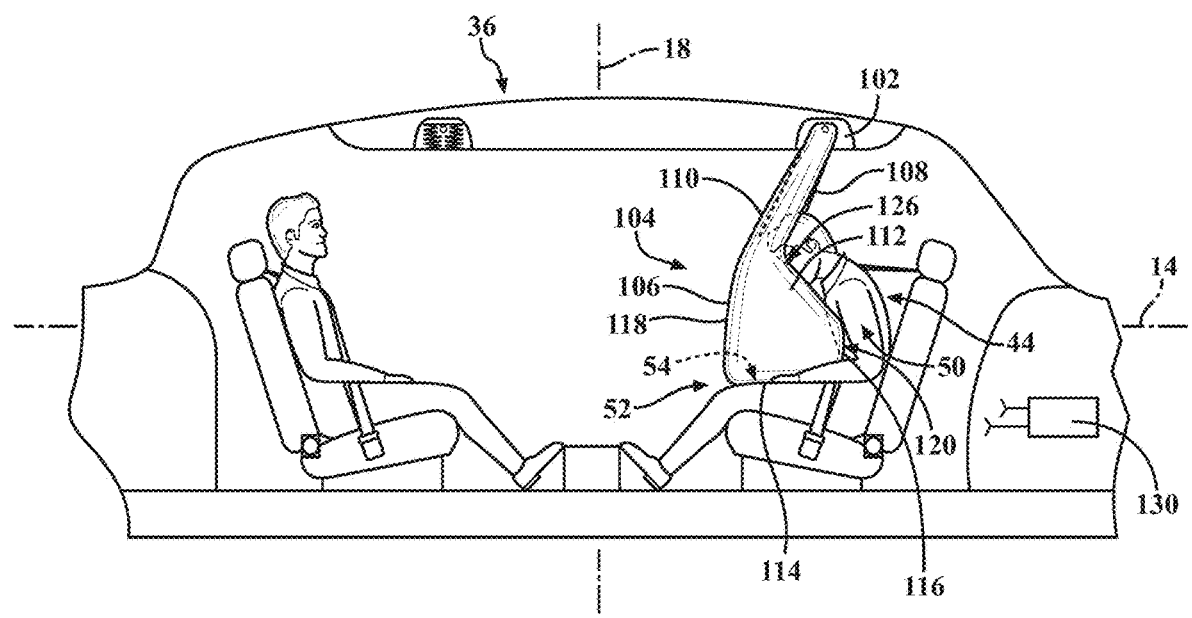
FIG. 6 is a schematic illustration of an occupant being cradled by an airbag having a second configuration.
Figure 7:
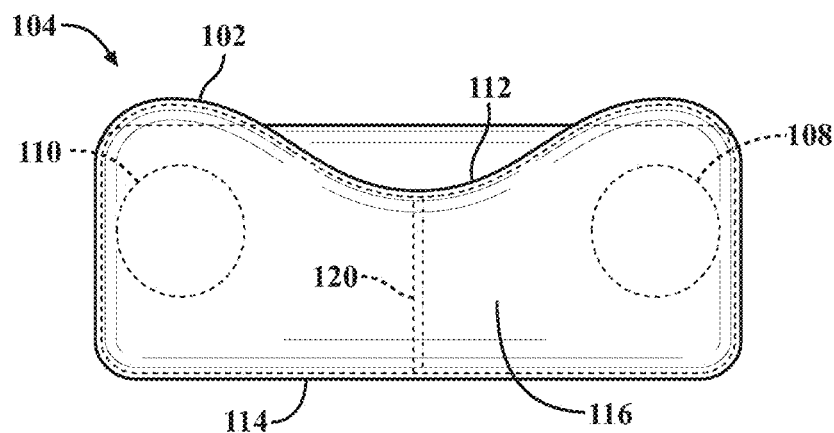
FIG. 7 is an end view of the airbag of FIG. 6.

The first tube 108 and the second tube 110, also referred to as the tubes 108, 110, each includes a distal end 122 and a proximal end 124. The distal end 122 of the tubes 108, 110 are each communicatively coupled to the inflator 102 so that the tubes 108, 110 can be simultaneously inflated. In another configuration, the distal end 122 of the first tube 108 is coupled to the first inflator and the distal end 122 of the second tube 110 is coupled to the second inflator. At the proximal end 124, the tubes 108, 110 can be spaced from one another with respect to the second axis 16 in the cross car direction and are communicatively coupled to the main body 106 between the first end 116 and the second end 118. As a result, an impact or absorption region 126 is defined between the first tube 108, the main body 106, and the second tube 110. The absorption region 126 may be configured to cradle a portion of the occupant 44 so that, for example, the upper half 50 of the occupant does not contact the lower half 52 as a result of unexpected movement of the vehicle 10. With reference to FIG. 6, the tubes 108, 110 can be curved with respect to the third axis 18 so that the absorption region 126 of the airbag 104 can be quickly positioned with respect to the occupant 44 upon being deployed.

Figure 8A:
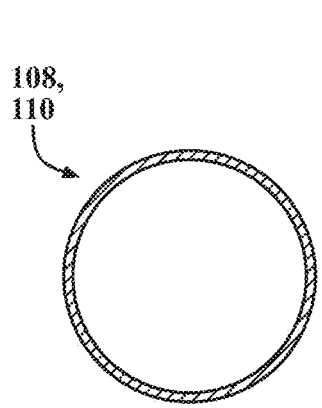
FIG. 8A is a cross-sectional view of the airbag of FIG. 5 along line 8A-8A.
Figure 8B:
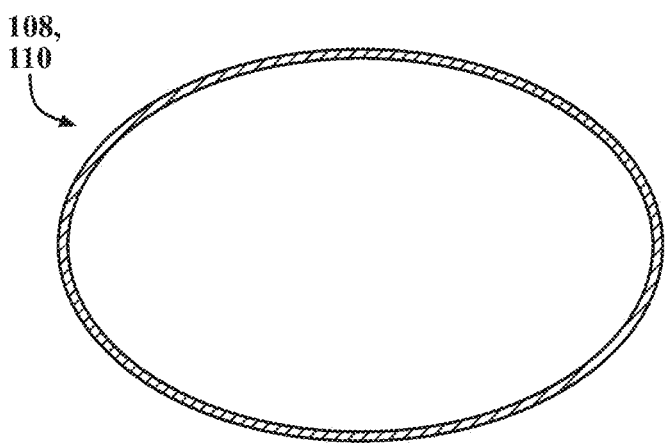
FIG. 8B is a cross-sectional view of the airbag of FIG. 5 along line 8B-8B.

With reference to FIGS. 8A and 8B, the first and second tubes 108, 110 can include a circular cross-section (FIG. 8A) or a non-circular cross-section (FIG. 8B) (e.g., oval, square, rectangular). Additionally or alternatively, the tubes 108, 110 may be made of a second material such as a woven fabric that is impermeable to gases (e.g., nitrogen, argon, etc.) and flame resistant. According to at least one aspect, the second material may be the same material as the first material of the main body 106. According to another aspect, the second material can be a different material that is stronger than the first material. For instance, a thicker woven fabric from nylon textiles (e.g., a silicon coated nylon) may be used as the second material for the tubes 108, 110.

Figure 9A:
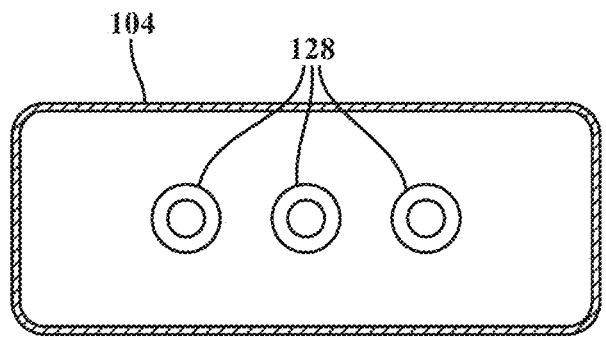
FIG. 9A is a cross-sectional view of a main body of the airbag of FIG. 4 along line 9A-9A showing one or more one-way flow valves.
Figure 9B:
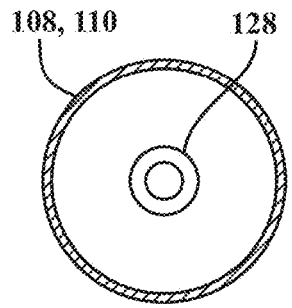
FIG. 9B is a cross-sectional view of a tube of the airbag of FIG. 4 along line 9B-9B showing one or more one-way flow valves.

With reference to FIGS. 4, 9A, and 9B, the airbag 104 can include one or more one-way flow valves 128. The one-way flow valves 128 may be desirable to ensure that the main body 106 properly inflates when the airbag 104 is deployed. The one-way flow valves 128 may be arranged in main body 106 (FIG. 9A) or in each of the tubes 108, 110 (FIG. 9B). Upon inflation, gas that flows past the one-way flow valves 128 will remain in the main body 106. The one-way flow valves 128 can be desirable so that the tubes 108 remain inflated throughout a crash event and provide necessary support to maintain a position of the occupant 44.

Figure 5:
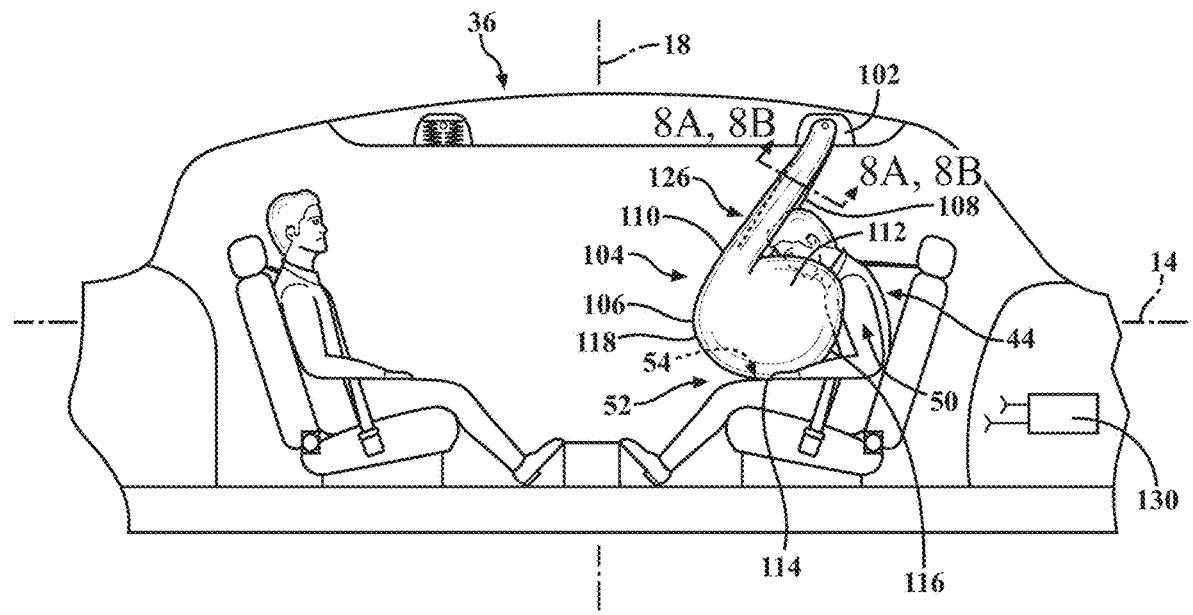
FIG. 5 is a schematic illustration of an occupant being cradled by an airbag having a first configuration.

A controller 130 can be arranged in the vehicle 10 and is configured deploy one or more of the airbags 104, as shown in FIGS. 5 and 6. When one of the airbags 104 is deployed, the tubes 108, 110 are rapidly filled with gas from the inflator 102. The main body 106 can be simultaneously filled so that the second side 114 contacts the lower half 52 of the occupant 44 and, more particularly, the lap area 54 of the occupant 44. In other words, the airbag 104 can be configured to use a portion of the occupant 44 as a reaction surface. Additionally, upon being deployed, the upper half 50 (e.g., head, neck, chest, etc.) of the occupant 44 in the respective seat 42 can be received in the absorption region 126 between the tubes 108, 110 and the first side 112 of the main body 106.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A restraint system of a vehicle having a roof and a cabin with a seat for an occupant, the restraint system comprising:
   an inflator mounted to the roof of the vehicle;
   an airbag communicatively coupled to the inflator and inflatable to a deployed position from a stored position, the airbag comprising:
      a main body, comprising:
         a first side facing the roof,
         a second side facing away from the roof,
         a first end coupled to the first and second sides,
         a second end coupled to the first and second sides, and
         a tether disposed within the main body and coupling the first side to the second side;
      a first tube having a first distal end communicatively coupled to the inflator and a first proximal end coupled to the main body between the first end and the second end, the first tube having a first one-way flow valve disposed within the first tube between the first distal end and the first proximal end and arranged upstream from the main body; and
      a second tube having a second distal end communicatively coupled to the inflator and a second proximal end coupled to the main body between the first end and the second end, the second tube having a second one-way flow valve disposed within the second tube between the second distal end and the second proximal end and arranged upstream from the main body, the tether being arranged laterally between the first tube and the second tube.

2. The restraint system of claim 1, wherein the inflator further comprises a first inflator coupled to the first tube and a second inflator coupled to the second tube.

3. The restraint system of claim 1, wherein the first tube and the second tube are made of a first material and the main body is made of a second material.

4. The restraint system of claim 3, wherein the first material is a different material than the second material.

5. The restraint system of claim 4, wherein the first material is a stronger material than the second material.

6. The restraint system of claim 1, wherein the first tube and the second tube each comprises a curved shape.

7. The restraint system of claim 1, wherein the first tube and the second tube each forms an acute angle with respect to a vertical axis.

8. The restraint system of claim 1, wherein the first tube and the second tube each comprises a circular cross-sectional shape.

9. The restraint system of claim 1, wherein the first tube and the second tube each comprises a non-circular cross-sectional shape.

10. The restraint system of claim 1, wherein the first tube and the second tube are made of a material that is thicker than the material of the main body.

11. A vehicle, comprising:
   an interior comprising a floor and a roof spaced from the floor;
   one or more seats coupled to the floor and arranged for one or more occupants; and
   a restraint system arranged with respect to each of the one or more seats, comprising:
      an inflator mounted to the roof,
      an airbag communicatively coupled to the inflator and inflatable to a deployed position from a stored position, the airbag comprising:
         a main body including a first side and a second side, the main body having a tether coupled to the first side and the second side so that the first side includes a concave contour facing the roof,
         a first tube having a first distal end communicatively coupled to the inflator and a first proximal end coupled to the main body, the first tube having a first one-way flow valve disposed within the first tube between the first distal end and the first proximal end and arranged upstream from the main body, and
         a second tube having a second distal end communicatively coupled to the inflator and a second proximal end coupled to the main body, the second tube having a second one-way flow valve disposed within the second tube between the second distal end and the second proximal end and arranged upstream from the main body, the tether being arranged laterally between the first tube and the second tube.

12. The vehicle of claim 11, wherein the first tube and the second tube are made of a first material and the main body is made of a second material.

13. The vehicle of claim 12, wherein the first material is a different material than the second material.

14. The vehicle of claim 13, wherein the first material is a stronger material than the second material.

15. The vehicle of claim 11, wherein the first tube and the second tube are made of a material that is thicker than the material of the main body.

* * * * *